United States Patent
Dellosa

(10) Patent No.: US 10,489,182 B2
(45) Date of Patent: Nov. 26, 2019

(54) VIRTUAL SLICER APPLIANCE

(71) Applicant: Disney Enterprises, Inc., Burbank, CA (US)

(72) Inventor: Robert Dellosa, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 268 days.

(21) Appl. No.: 15/436,526

(22) Filed: Feb. 17, 2017

(65) Prior Publication Data
US 2018/0241793 A1    Aug. 23, 2018

(51) Int. Cl.
*H04L 29/06* (2006.01)
*G06F 9/455* (2018.01)

(52) U.S. Cl.
CPC ...... *G06F 9/45558* (2013.01); *H04L 65/4076* (2013.01); *H04L 65/605* (2013.01); *H04L 65/607* (2013.01); *G06F 2009/4557* (2013.01); *G06F 2009/45562* (2013.01); *G06F 2009/45595* (2013.01)

(58) Field of Classification Search
CPC ... G06F 2009/45562; G06F 2009/4557; G06F 2009/45595; G06F 9/45558; H04L 65/4076; H04L 67/1097; H04L 65/605; H04L 65/607; H04N 19/142; H04N 21/2187; H04N 7/17318
USPC ...................... 709/219; 725/93, 34
See application file for complete search history.

(56) References Cited

U.S. PATENT DOCUMENTS

| | | | |
|---|---|---|---|
| 2008/0201736 A1* | 8/2008 | Gordon | H04N 7/17318 725/34 |
| 2016/0029047 A1* | 1/2016 | Spidella | H04N 21/2187 725/93 |
| 2017/0185455 A1* | 6/2017 | Le Bars | H04N 19/142 |
| 2018/0146216 A1* | 5/2018 | Chang | H04L 65/4076 |

OTHER PUBLICATIONS uplynk.com "An Introduction to the Live Slicer API," [Accessed Online on May 22, 2017] http://support.uplynk.com/tut_live_slicer_api.html.

* cited by examiner

*Primary Examiner* — Jungwon Chang
(74) *Attorney, Agent, or Firm* — Patterson + Sheridan, LLP

(57) ABSTRACT

The disclosure provides an approach for virtualizing a slicer server. A slicer program running in a virtual machine receives a multicast Internet Protocol (IP) signal, re-encodes the signal to a streaming-friendly format, and pushes the re-encoded signal to a content distribution network that distributes the video signal to clients either live or on demand. In one embodiment, a new virtual machine including the slicer is cloned from a template for each broadcast channel that is created, with the newly-cloned VM being used to process IP signals for the corresponding broadcast channel. In addition, the slicer running in the VM may transmit to the content delivery network a time sequence indicating when content in the re-encoded signal should be streamed for play out, and the time sequence may be based on a time that is synchronized to an external server.

20 Claims, 3 Drawing Sheets

VIRTUAL SLICER APPLIANCE

BACKGROUND

Field of the Invention

Embodiments of the disclosure presented herein relate to broadcast delivery systems and, more specifically, to a slicer program deployed in a virtual machine.

Description of the Related Art

Traditional on-air broadcast delivery systems rely on hardware-based appliance solutions. For example, a server for providing streaming content of a broadcast channel may consist of two physical rack-mounted server computers, two decklink cards for video capture over serial digital interface (SDI), and two timecode cards. Two physical servers are required per channel so that, if one server goes down, the other can take over.

Such traditional physical servers are expensive, not portable, and do not share server or storage architectures. For example, two physical rack-mounted servers can cost $8,000 to $10,000, and this figure doubles when another two physical servers are deployed at a secondary location for disaster recovery purposes. Further, physical servers cannot be easily moved (e.g., from one datacenter to another), limit the broadcast delivery system to particular server hardware, and do not decrease datacenter footprint or energy by taking advantage of a shared server or storage architecture.

SUMMARY

One embodiment of this disclosure provides a computer-implemented method for uploading content to a content delivery network. The method includes cloning, for a first channel, a first virtual machine (VM) including a slicer program from a predefined template. The method further includes executing the first VM, where, during the execution of the first VM, the slicer performs operations including: receiving an internet protocol (IP) signal of a broadcast channel, re-encoding the IP signal of the broadcast channel to a re-encoded signal, and transmitting the re-encoded signal to the content delivery network for distribution to one or more clients.

Further embodiments include a non-transitory computer-readable storage medium storing instructions that when executed by a computer system cause the computer system to perform the method set forth above, and a computer system programmed to carry out the method set forth above.

BRIEF DESCRIPTION OF THE DRAWINGS

So that the manner in which the above recited embodiments are attained and can be understood in detail, a more particular description of embodiments of this disclosure, briefly summarized above, may be had by reference to the appended drawings.

It is to be noted, however, that the appended drawings illustrate only typical embodiments and are therefore not to be considered limiting of its scope, for this disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the disclosure presented herein provide an approach for virtualizing a slicer server. As used herein, a "slicer" refers to a broadcast delivery program (e.g., a Linux® daemon process, an application, or other software) that receives a video signal, encodes the video signal in a streaming-friendly format, and pushes the video signal to a content distribution network that distributes the video signal either live or on demand to users' web browsers or mobile device applications. In one embodiment, a new virtual machine (VM) including a slicer program is cloned from a template for each broadcast channel. In such a case, the newly-cloned VM is used to process IP signals for the corresponding broadcast channel by re-encoding the IP signal to a streaming-friendly format, slicing the video into short video clips, and uploading the video clips in succession to the content distribution network. In addition, the slicer running in the VM may transmit to the content delivery network a time sequence based on a time that is synchronized to an external server, with the time sequence indicating when content in the re-encoded signal should be streamed for play out.

Figure 1:
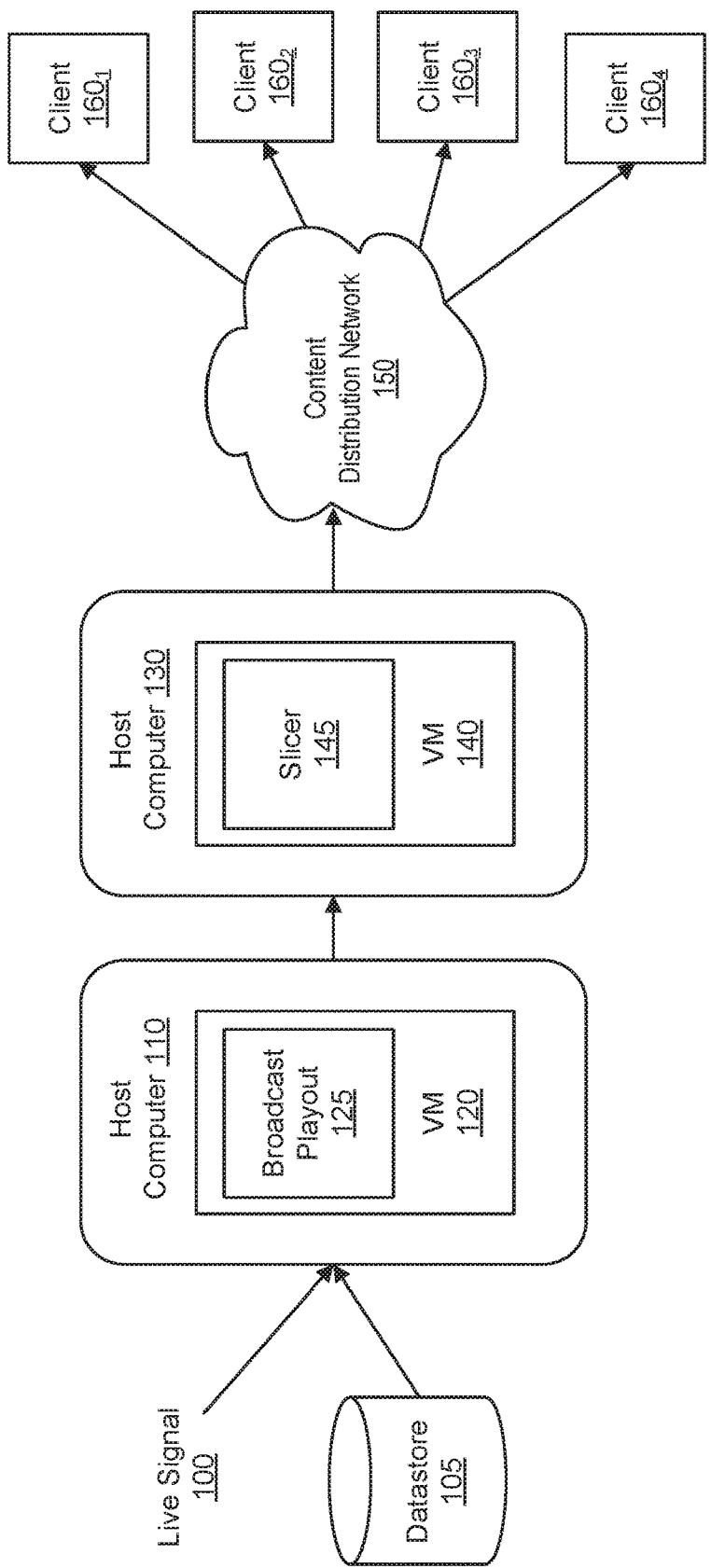
FIG. 1 illustrates a computing environment in which one or more embodiments may be implemented.

Referring now to FIG. 1, a computing environment in which one or more embodiments may be implemented is shown. Illustratively, a broadcast playout program 125 runs in a virtual machine (VM) 120 that itself runs in a host computer 110. VMs are software implementations of physical computing devices and execute programs like a physical computer. In one embodiment, a virtual machine implements, in software, a computing platform that supports the execution of software applications (and other programs) under the control of a guest operating system (OS). A VM running applications in a host computer shares physical processing resources with other virtual machines and system tasks. A virtualization software layer (also referred to as a "hypervisor") is installed on top of host computer 110 hardware and supports a VM execution space within which multiple VMs running desktop operating systems and applications, including the broadcast playout program 125, may be concurrently instantiated and executed.

As shown, the broadcast playout program 125 is configured to convert a live video signal 100, such as a serial digital interface (SDI) signal, or, alternatively, a file-based video stored in a datastore 105, into an IP signal that is transmitted to one or more endpoints. In one embodiment, the broadcast playout 125 may convert the live video signal or the video file into an IP multicast stream that is transmitted over a network to multiple endpoints. The endpoints may include the slicer 145, as well as other servers which distribute content independently.

The broadcast playout 125 differs from traditional broadcast playout servers, which were not executed in VMs and which typically converted satellite signals to SDI signals, rather than to IP signals. That is, rather than physical input of SDI signals, embodiments may use a virtual network interface via IP signals. The traditional broadcast playout server also had to be physically proximate to a slicer server, as SDI signals cannot be routed through a network. In contrast, the IP based signal output by the broadcast playout 125 can be routed through a network to different locations, so the host computer 110 in which the broadcast playout 125 runs need not be in close proximity to the host computer 130 in which the slicer 145 runs. For example, the host computers 110 and 130 may be on the same network but physically located in different datacenters so long as slicer 145 can see the multicast signal from the broadcast playout 125.

As shown, the slicer 145 also runs in a VM 140 that runs inside the host computer 130. It should be understood that multiple such VMs including slicers may be deployed and share common hardware resources of the host computer 130. For example, a VM with 4 virtual CPUs, 8 GB of memory, and running the Ubuntu 14.01 operating system may be deployed to act as a single virtual slicer server. Each such VM replaces the two-server rack of a traditional slicer server, which was required for failover in case one of the two servers suffered a hardware failure. In contrast to such two-server racks, VMs do not fail, and host hardware failures can be handled by automatically migrating the VMs running in a failed host to another host or hosts.

In operation, the slicer 145 receives an IP signal from the broadcast playout 125, re-encodes the IP signal to a streaming-friendly format, and pushes the re-encoded signal to a content distribution network 150. In one embodiment, the slicer 145 may subscribe to a multicast IP stream provided by the broadcast playout 125. For example, the broadcast playout 125 may transmit a multicast MPEG (Moving Picture Experts Group) stream over a network to a number of endpoints including the slicer 145. In turn, the slicer 145 re-encodes the MPEG stream it receives into a streaming-friendly format such as the HLS (HTTP Live Streaming) format and uploads the re-encoded signal to the content distribution network 150. In one embodiment, the slicer 145 may slice the re-encoded video signal into short (e.g., 2-3 second) video clips and upload the video clips in succession to the content distribution network 150 as an IP-based transport stream.

In addition to uploading the re-encoded signal to the content distribution network 150, the slicer 145 further provides a time sequence of when the content in the re-encoded signal should be streamed to clients to be played out. In one embodiment, the VM's time may be synchronized with an external time source, and the slicer 145 (or another program) may provide this time to the content distribution network 150 to synchronize broadcast time with content streams. For example, a slicer application programming interface (API) may permit a user to specify a start timecode indicating the video frame and broadcast time (e.g., frame 2, time 00:10:02) where an advertisement or content boundary should occur, with the broadcast time used being based on the slicer's 145 local time that is synchronized to the external time source. Such a start timecode may be used to achieve frame accuracy, and without such timecodes in the stream, the slicer 145 may default to using the time from the OS system clock where the slicer 145 is running.

The external time source used may be, e.g., a Precision Time Protocol (PTP) or Network Time Protocol (NTP) time source, and the external time source should be more reliable than a local server clock which may drift. For example, an operating system service or an application may be used to synchronize the VM's time to the external time source time. This external time source replaces the physical time code card previously used in the two physical rack-mounted servers for accurate timekeeping, as a separate time code card can be omitted so long as the OS system has a reliable time source to synchronize to, such as the PTP time source.

The content distribution network 150, which as shown is in the cloud, is responsible for streaming the streaming-friendly (e.g., HLS format) content it receives from the slicer 145, in the time sequence provided by the slicer 145, to clients $110_{1-4}$. The clients $110_{1-4}$ may include, e.g., web browsers running in laptop or desktop computers or mobile device applications running in mobile phones or tables that are capable of receiving and playing streaming videos. Any feasible content distribution network 150 may be used, including commercially available content distribution networks such as Verizon® content distribution network services.

Figure 2:
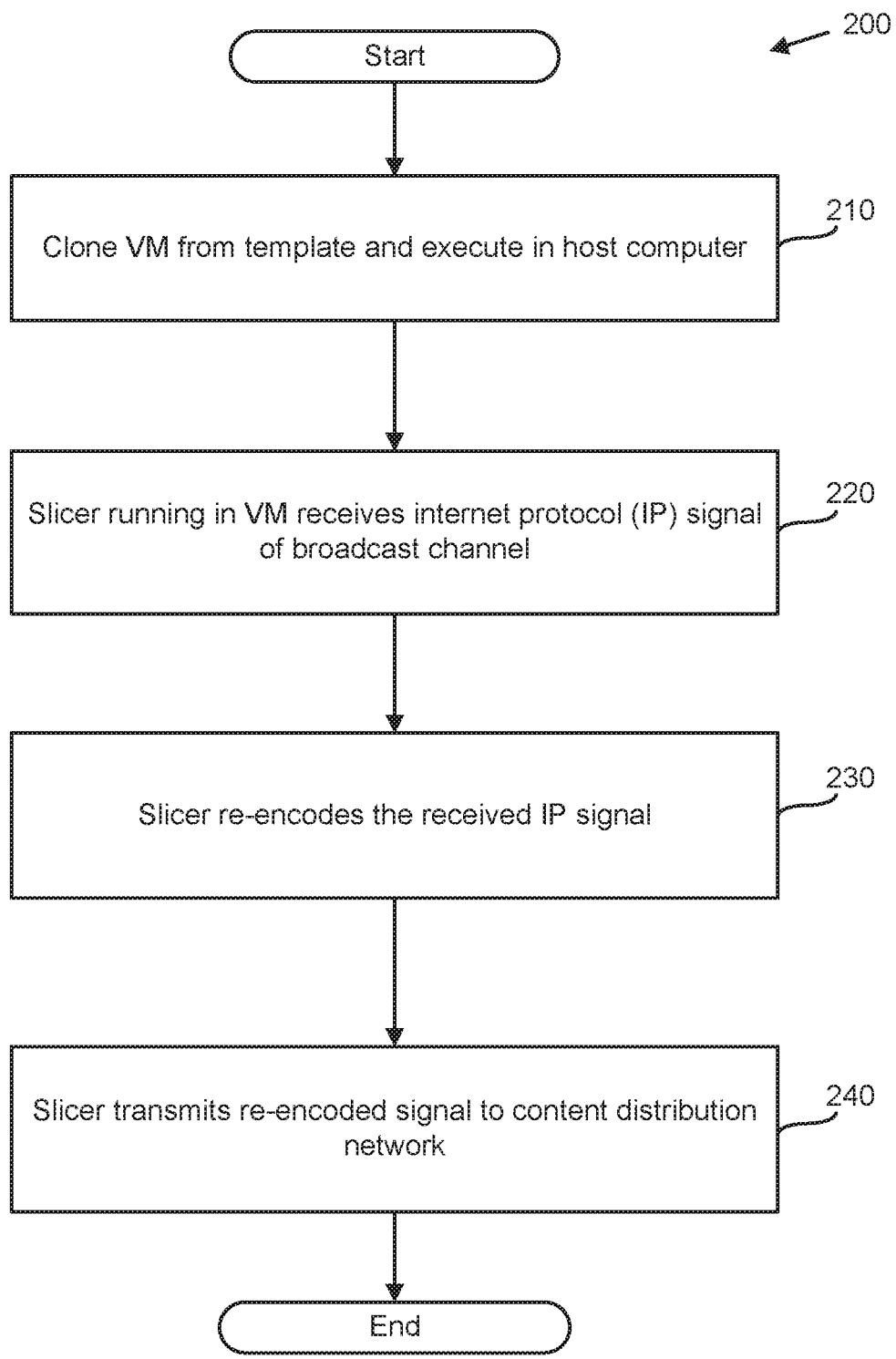
FIG. 2 illustrates a method of virtualizing a slicer server, according to an embodiment.

FIG. 2 illustrates a method 200 of virtualizing a slicer server, according to an embodiment. As shown, the method 200 begins at step 210, where a VM including a slicer program is cloned from a template and executed in a host computer. Cloning refers to making a copy of the template, thereby creating a new instance of the template VM that can run the slicer. As discussed, multiple VMs, such as the cloned VMs, may run on the same host computer(s) and share the same storage architecture, which is more energy and cost effective than traditional physical slicer servers. The template is a master copy of a VM from which many clone VMs may be created. The template, which is also referred to herein as a virtual slicer appliance, includes virtual disk and configuration file(s) of a VM, and the virtual disk itself includes an operating system and the slicer. As discussed, a VM with 4 virtual CPUs, 8 GB of memory, and running the Ubuntu 14.01 operating system may be deployed to act as a single virtual slicer server. The template may be a master copy of such a VM used to deploy clones of the same VM.

In one embodiment, a distinct VM including the slicer may be cloned from the template for each new broadcast channel. Examples of channels include the Disney channel, Disney Junior, Disney XD©, and the like. The VM cloned for a given broadcast channel is dedicated to processing signals received for that particular channel. Further, one cloned VM may be used to replace two physical servers. For example, a datacenter servicing four channels would have required eight physical servers, whereas four VMs may be cloned in one embodiment to perform the same functionalities as the eight physical servers.

Redundant physical servers were traditionally required so that if, e.g., one of the servers in a two-server rack suffered a hardware failure, the other server could take over. In contrast, failure of host computer hardware on which VMs run may be managed at the hypervisor level by automatically migrating the VMs previously running in the failed host computer to another host computer in the same environment. In addition, disaster recovery of an entire datacenter is possible, as the disk images of the VMs in which the slicer runs may be replicated to another datacenter so that the VMs can be restarted in the other data center if the original datacenter goes down.

At step 220, the slicer receives an internet protocol (IP) signal of a broadcast channel. In one embodiment, the received IP signal may be a multicast signal sent from a broadcast playout program to a number of endpoints including the virtual slicer, and other servers for independent distribution. As discussed, the virtual slicer may by one of the endpoints listening to a multicast IP stream transmitted by a broadcast playout. The broadcast playout itself may convert a live video signal (e.g., a serial digital interface (SDI) signal), a file-based video stored in a datastore 105, or the like into an IP signal, such as a MPEG format stream. The broadcast playout may then deliver the IP signal to appropriate endpoints. In one embodiment, the broadcast playout may also run in a virtual machine, as discussed above with respect to FIG. 1.

At step 230, the slicer re-encodes the received IP signal to a more streaming friendly signal. Doing so converts content received from the broadcast playout to a form that can be streamed to clients such as web browsers and mobile device applications. For example, the slicer may re-encode an MPEG format stream received from the broadcast playout into HLS format using well-known techniques.

At step 240, the slicer transmits the re-encoded signal to the content distribution network. In one embodiment, the slicer may slice the re-encoded video signal into short video clips (e.g., 2-3 second video clips) and upload the video clips in succession as an IP-based transport stream to the content distribution network. In turn, the content distribution network may distribute the re-encoded content either live or on demand to client web browsers or mobile device applications. In addition to the content itself, the slicer may also provide a time sequence of when the content in the re-encoded signal should be streamed to clients to be played out. The slicer itself, or another program, may synchronize to an external time source, such as a PTP or NTP time source, to obtain a more precise time for synchronizing the broadcast time with content streams. For example, a slicer API may permit a user to specify a start timecode indicating the video frame and broadcast time where an advertisement or content boundary occurs, and the broadcast time used may be based on the slicer's local time that is synchronized to the external time source.

Figure 3:
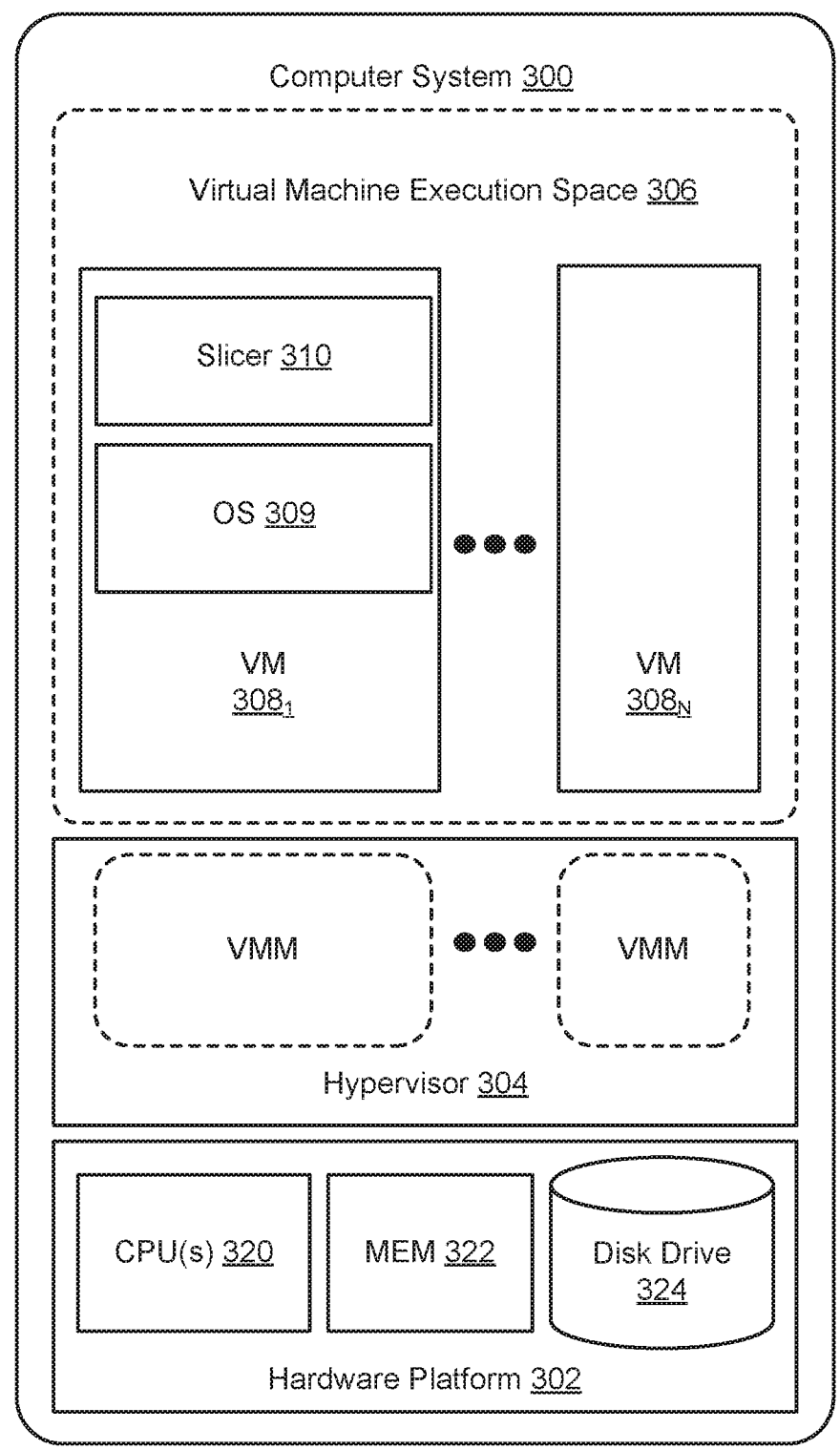
FIG. 3 illustrates a computer system in which an embodiment of this disclosure may be implemented.

FIG. 3 illustrates a computer system 300 in which an embodiment of this disclosure may be implemented. The computer system 300 corresponds to the host computer 130 discussed above with respect to FIG. 1. Illustratively, the computer system 300 may be constructed on a server class hardware platform, such as hardware platform 302, which may be, e.g., an x86 architecture platform that includes processor(s) 320, system memory 322, and a disk drive 324, among other things. Although a single computer system 300 is shown, it should be understood that multiple physical servers may be deployed in datacenter.

A virtualization software layer, also referred to as a hypervisor 304, is installed on top of the hardware platform 302. The hypervisor 304, which as shown include virtual machine monitors (VMMs), supports a virtual machine execution space 306 within which multiple VMs running operating systems and applications may be concurrently instantiated and executed. As shown, virtual execution space 306 includes VMs $308_{1-N}$. As shown, a slicer program 310 runs on an operating system 309 in the VM $308_1$. Although a single slicer 310 is shown, it should be understood that a new VM including a slicer program may generally be cloned from a template for each broadcast channel. The slicer 310 is configured to listen to an IP stream and deliver sliced content to a content distribution network for distribution to clients such as web browsers and mobile device applications. In one embodiment, the slicer may be included in a VM that is cloned from a template and may be executed to receive an IP signal of a broadcast channel, re-encode the received IP signal to a streaming-friendly signal, and transmit the re-encoded signal to the content distribution network for distribution to clients, as discussed above with respect to FIG. 2.

Advantageously, techniques disclosed herein provide slicers running in VMs that can share the same underlying physical resources with other VMs, which reduces the costs of purchasing physical servers and doesn't require the slicer to be tied down to specific hardware. Further, VMs are more portable than physical server racks, allowing the slicer to be migrated along with a VM across physical host computers and datacenters. The portability of VMs also improves disaster recovery of the broadcast delivery system, which can be restarted on another datacenter if one datacenter goes down. In addition, the slicer is configured to listen to an IP signal, such as a multicast stream, rather than the traditional SDI signal, which allows the slicer to be placed anywhere on the same network as the broadcast playout providing the IP signal, including in a different physical datacenter.

In the preceding description, reference is made to embodiments of the present disclosure. However the present disclosure is not limited to specific described embodiments. Instead, any combination of the preceding features and elements, whether related to different embodiments or not, is contemplated to implement and practice the present disclosure. Furthermore, although embodiments presented herein may achieve advantages over other possible solutions and/or over the prior art, whether or not a particular advantage is achieved by a given embodiment is not limiting. Thus, the preceding aspects, features, embodiments and advantages are merely illustrative and are not considered elements or limitations of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "system."

Furthermore, aspects of the present disclosure may take the form of a computer program product embodied in one or more computer readable medium(s) having computer readable program code embodied thereon. Any combination of one or more tangible computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for uploading content to a content delivery network, comprising:
    for a first channel, cloning a first virtual machine (VM) including a slicer program from a predefined template, the predefined template including one or more configuration files and a virtual disk which includes an operating system and the slicer program; and
    executing the first VM, wherein, during the execution of the first VM, the slicer program performs operations including:
        receiving an internet protocol (IP) signal of a broadcast channel,
        re-encoding the IP signal of the broadcast channel to a re-encoded signal, and
        transmitting the re-encoded signal to the content delivery network for distribution to one or more clients.

2. The method of claim 1, wherein the received IP signal is a multi-cast stream from a broadcast playout program that converts live or file-based video content into the multi-cast stream.

3. The method of claim 1, wherein re-encoding the IP signal includes re-encoding an MPEG (Moving Picture Experts Group) format stream into HLS (HTTP Live Streaming) format.

4. The method of claim 1, wherein the operations performed by the slicer program further include transmitting, to the content delivery network, a time sequence indicating when content in the re-encoded signal should be streamed for play out.

5. The method of claim 4, wherein the time sequence is based on a time obtained by synchronizing to a time source external to a host computer in which the first VM executes.

6. The method of claim 1, further comprising, cloning, for a second channel, a second VM including the slicer program from the predefined template.

7. The method of claim 1, wherein:
    the operations performed by the slicer program further include slicing the IP signal's content into video clips; and
    the video clips are transmitted to the content delivery network.

8. The method of claim 1, further comprising, responsive to a hardware failure in a host computer in which the first VM executes, migrating the first VM to another host computer.

9. A non-transitory computer-readable storage medium storing a program, which, when executed by a processor performs operations for uploading content to a content delivery network, the operations comprising:
    for a first channel, cloning a first virtual machine (VM) including a slicer program from a predefined template, the predefined template including one or more configuration files and a virtual disk which includes an operating system and the slicer program; and
    executing the first VM, wherein, during the execution of the first VM, the slicer program performs steps including:
        receiving an internet protocol (IP) signal of a broadcast channel,
        re-encoding the IP signal of the broadcast channel to a re-encoded signal, and
        transmitting the re-encoded signal to the content delivery network for distribution to one or more clients.

10. The computer-readable storage medium of claim 9, wherein the received IP signal is a multi-cast stream from a broadcast playout program that converts live or file-based video content into the multi-cast stream.

11. The computer-readable storage medium of claim 9, wherein re-encoding the IP signal includes re-encoding an MPEG (Moving Picture Experts Group) format stream into HLS (HTTP Live Streaming) format.

12. The computer-readable storage medium of claim 9, wherein the steps performed by the slicer program further include transmitting, to the content delivery network, a time sequence indicating when content in the re-encoded signal should be streamed for play out.

13. The computer-readable storage medium of claim 12, wherein the time sequence is based on a time obtained by synchronizing to a time source external to a host computer in which the first VM executes.

14. The computer-readable storage medium of claim 9, the operations further comprising, cloning, for a second channel, a second VM including the slicer program from the predefined template.

15. The computer-readable storage medium of claim 9, wherein:
    the steps performed by the slicer program further include slicing the IP signal's content into video clips; and
    the video clips are transmitted to the content delivery network.

16. The computer-readable storage medium of claim 9, the operations further comprising, responsive to a hardware failure in a host computer in which the first VM executes, migrating the first VM to another host computer.

17. A system, comprising:
    a processor; and
    a memory, wherein the memory includes a program configured to perform operations for uploading content to a content delivery network, the operations comprising:
        for a first channel, cloning a first virtual machine (VM) including a slicer program from a predefined template, the predefined template including one or more configuration files and a virtual disk which includes an operating system and the slicer program, and
        executing the first VM, wherein, during the execution of the first VM, the slicer program performs steps including:
            receiving an internet protocol (IP) signal of a broadcast channel;
            re-encoding the IP signal of the broadcast channel to a re-encoded signal; and
            transmitting the re-encoded signal to the content delivery network for distribution to one or more clients.

18. The system of claim 17, wherein the received IP signal is a multi-cast stream from a broadcast playout program that converts live or file-based video content into the multi-cast stream.

19. The system of claim 17, wherein:
the steps performed by the slicer program further include transmitting, to the content delivery network, a time sequence indicating when content in the re-encoded signal should be streamed for play out; and
the time sequence is based on a time obtained by synchronizing to a time source external to a host computer in which the first VM executes.

20. The system of claim 17, the operations further comprising, cloning, for a second channel, a second VM including the slicer program from the predefined template.

* * * * *